(12) United States Patent
Hu (10) Patent No.: US 8,104,382 B2
(45) Date of Patent: Jan. 31, 2012

(54) UNIVERSAL JOINT

(76) Inventor: Bobby Hu, Taichung (TW)

( * ) Notice: Subject to any disclaimer, the term of this patent is extended or adjusted under 35 U.S.C. 154(b) by 307 days.

(21) Appl. No.: 12/481,723

(22) Filed: Jun. 10, 2009

(65) Prior Publication Data

US 2010/0170368 A1 Jul. 8, 2010

(30) Foreign Application Priority Data

Jan. 6, 2009 (TW) ................................ 98100213 A (51) Int. Cl.
*B25B 23/16* (2006.01)
(52) U.S. Cl. ...................... 81/177.75; 81/177.85; 403/57
(58) Field of Classification Search ............... 81/177.75, 81/177.85, 177.2; 403/74, 57, 322.2, 325, 403/114–116, 123
See application file for complete search history.

(56) References Cited

U.S. PATENT DOCUMENTS

| | | | | |
|---|---|---|---|---|
| 4,936,701 A | * | 6/1990 | Allen et al. | 403/57 |
| 6,092,441 A | | 7/2000 | Jarvis | 81/177.2 |
| 6,823,762 B2 | * | 11/2004 | Hu | 81/177.85 |
| 7,062,997 B2 | * | 6/2006 | Hu | 81/177.2 |

* cited by examiner

*Primary Examiner* — Debra S Meislin
(74) *Attorney, Agent, or Firm* — Alan Kamrath; Kamrath IP Lawfirm, PA (57) ABSTRACT

A universal joint includes a coupling member having an end for coupling with a tool. A body includes a rounded base pivotably mounted to the other end of the coupling member. The body further includes a drive column spaced from the rounded base along an axis. A reinforcing section is intermediate the rounded base and the drive column. The reinforcing section includes an outer periphery having a recessed portion with a receptacle extending in a radial direction perpendicular to the axis. A control member is moveably received in the receptacle to control coupling of the drive column and an object to be driven. In any case, a spacing from an outer end of the control member to the axis in the radial direction is substantially not larger than a spacing from the outer periphery of the reinforcing section to the axis in the radial direction.

19 Claims, 10 Drawing Sheets

UNIVERSAL JOINT

BACKGROUND OF THE INVENTION

The present invention relates to a universal joint and, more particularly, to a universal joint including a control member for locking an object such as a socket without the risks of injuring a hand of an operator and avoiding damage to the control member due to impingement by an external object when the universal joint is driven by a power drive.

A typical tool for applying rotational force can be coupled with a socket to rapidly tighten or loosen fasteners in an engine compartment of a vehicle. An extension can be coupled between the tool and the socket to reach a fastener difficult to access. In cases where the rotating axis of the fastener is not coincident to the driving axis of the tool, an adaptor such as a universal joint is required.

U.S. Pat. No. 6,092,441 discloses an articulating adapter including first and second drive sections. One of the first and second drive sections is attached to a socket wrench drive, while the other is attached to a socket by a spring-biased ball. The first drive section has a square drive at a first end and a skirt section at a second end. The second drive section includes a square drive at a first end and a rounded base section at a second end. The rounded base section includes an oval shaped bore and is pivotally seated in a cavity in the skirt section of the first drive section. A pivot pin extends through the skirt section of the first drive section and the bore of the second drive section. Thus, the rotating axis of the socket can be at an angle with the driving axis of the power drive by providing the articulating adapter during tightening or loosening of a fastener. An annular collar is provided between the square drive and the rounded base of the second drive section. However, the annular collar is too small to be firmly gripped by the fingers of the operator during tightening or loosening of the fastener, such that the whole articulating adapter wobbles. If an extra element is added to stabilize the articulating adapter, the extra element would injure the hand of the operator during rotation of the articulating adapter and would adversely affect the torque capacity at the annular collar. Furthermore, when the spring biasing the ball for securely coupling the socket has a low elastic coefficient, the coupling force imparted to the ball will be too high, leading to difficulties in coupling or disengaging the socket with or from the articulating adapter. On the other hand, if the spring biasing the ball for securely coupling the socket has a high elastic coefficient, the coupling force imparted to the ball will be too small. As a result, the socket is liable to vibrate and disengage from the articulating adapter when the power drive rotates and, thus, creates vibration.

Thus, a need exists for a universal joint that can operate stably during operation and that has reinforced structural strength while preventing injury to the hand of the operator.

BRIEF SUMMARY OF THE INVENTION

The present invention solves this need and other problems in the field of stable and safe operation by providing, in a preferred form, a universal joint including a coupling member having first and second ends spaced along a first axis. The first end of the coupling member is adapted to be coupled to a power drive. A body includes a rounded base and a drive column spaced along a second axis. The rounded base is pivotably mounted to the second end of the coupling member about a pivot axis perpendicular to the first axis, allowing adjustment of an angle between the first and second axes. The body further includes a reinforcing section intermediate the rounded base and the drive column along the second axis. The reinforcing section includes an outer periphery about the second axis. The outer periphery of the reinforcing section includes a recessed portion having a receptacle extending in a radial direction perpendicular to the second axis. The drive column includes a bore extending along the second axis and in communication with the receptacle. The drive column further includes a detent hole extending in a transverse direction transverse to and in communication with the bore. A mover is movably received in the bore along the second axis. A detent member is movably received in the detent hole in the transverse direction. The detent member is operably connected to the mover so that movement of the mover along the second axis allows movement of the detent member in the transverse direction between a protruded position at least partially outside of the detent hole and a retracted position in the detent hole. The drive column is adapted to couple with an object to be driven when the detent member protrudes out of the detent hole. The drive column is disengageable from the object when the detent member is received in the detent hole. A control member is moveably received in the receptacle between first and second positions spaced in the radial direction. The control member includes inner and outer ends spaced in the radial direction. The outer end of the control member in the first position has a first spacing to the second axis in the radial direction larger than a second spacing from the outer end of the control member in the second position to the second axis in the radial direction. The first spacing is substantially not larger than a third spacing from the outer periphery of the reinforcing section to the second axis in the radial direction. The inner end of the control member is operably engaged with the mover, so that movement of the control member in the radial direction between the first and second positions allows movement of the detent member in the transverse direction between the protruded position and the retracted position through movement of the mover along the second axis.

In the most preferred form, the control member further includes a groove intermediate the inner and outer ends in the radial direction. The groove includes first and second sliding faces and first and second abutting faces. The first and second sliding faces are parallel to each other and extend in a direction transverse to the radial direction. The first and second abutting faces are parallel to each other and extend in a direction transverse to the first and second sliding faces. The second sliding face is intermediate the first and second abutting faces in the radial direction and along the second axis. The second abutting surface is intermediate the first and second sliding faces in the radial direction and along the second axis. The second abutting face is intermediate the second sliding face and the outer end of the control member in the radial direction. The first sliding face is intermediate the first abutting face and the inner end of the control member in the radial direction. The mover includes first and second ends spaced along the second axis. The second end of the mover is moveably received in the groove of the control member. The second end of the mover includes a pressing face and a third sliding face. A spring is received in the receptacle of the reinforcing section and biases the control member to the first position. When the control member is in the first position, the third sliding face abuts the first sliding face, and the pressing face is spaced from the first abutting face along the second axis. When the control member is in the second position, the third sliding face abuts the second sliding face. The detent member protrudes out of the detent hole when the third sliding face abuts the first sliding face and when the pressing face abuts the first abutting face, preventing the object from disengaging from the drive column.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "fourth", "fifth", "sixth", "inner", "outer", "side", "end", "portion", "section", "radial", "inward", "spacing", "length", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A universal joint according to the preferred teachings of the present invention is shown in the drawings and generally designated 10. According to the preferred form shown, universal joint 10 includes a body 1, a control device 2, and a coupling member 3. Coupling member 3 includes first and second ends 31 and 33 spaced along a first axis 52. First end 31 of coupling member 3 includes a coupling hole 5 for coupling with a tool including but not limited to a pneumatic or electric tool, so that coupling member 3 can be driven by the tool. Second end 33 of coupling member 3 includes a compartment 32 having an outer section 36 and an inner section 34 intermediate outer section 36 and coupling hole 5 along first axis 52.

In the preferred form shown, body 1 includes a rounded base 11 and a drive column 12 spaced along a second axis 54. The rounded base 11 is pivotably received in outer section 36 about a pivot axis 56 perpendicular to first axis 52, allowing adjustment of an angle between first and second axes 52 and 54. Body 1 further includes a reinforcing section 13 intermediate rounded base 11 and drive column 12 along second axis 54. Reinforcing section 13 includes an outer periphery about second axis 54. The outer periphery of reinforcing section 13 includes a recessed portion 14 having a receptacle 131 extending in a radial direction perpendicular to second axis 54. Reinforcing section 13 has a length T2 along second axis 54. Body 1 further includes a neck 112 intermediate reinforcing section 13 and rounded base 11.

In the preferred form shown, rounded base 11 includes a through-hole 111. A pin 4 defines pivot axis 56 and extends through second end 33 of coupling member 3 along pivot axis 56 and through through-hole 111, pivotably connecting rounded base 11 to second end 33 of coupling member 3. A spring 6 is received in inner section 34 and biases rounded base 11 away from inner section 34. In the most preferred form shown, through-hole 111 of rounded base 11 includes first and second sectors 116 on opposite sides of second axis 54 and an intermediate section 118 between first and second sectors 116. First sector 116 has oval cross sections and includes first and second sidewalls 113 and 114 spaced along second axis 54. Second sidewall 114 of first sector 116 is intermediate first sidewall 113 of first sector 116 and reinforcing section 13 along second axis 54. Second sector 116 has oval cross sections and includes third and fourth sidewalls 113 and 114 spaced along the second axis 54. Third sidewall 113 of second sector 116 is intermediate fourth sidewall 114 of second sector 116 and reinforcing section 13 along second axis 54. First sidewall 113 of first sector 116 is perpendicular to fourth sidewall 114 of second sector 116. Second sidewall 114 of first sector 116 is perpendicular to third sidewall 113 of second sector 116. First sidewall 113 of first sector 116 is parallel to and spaced from third sidewall 113 of second sector 116 and at an acute angle with second axis 54. Second sidewall 114 of first sector 116 is parallel to and spaced from fourth sidewall 114 of second sector 116 and at an acute angle with second axis 54 the same as that between first sidewall 113 of first sector 116 and second axis 54.

In the preferred form shown, drive column 12 is square in cross section and includes a bore 121 extending along second axis 54 and in communication with receptacle 131. Drive column 12 further includes a detent hole 122 extending in a transverse direction transverse to and in communication with bore 121.

In the preferred form shown, universal joint 10 further includes a control device 2 including a control member 20 moveably received in receptacle 131 between first and second positions spaced in the radial direction. Control member 20 includes inner and outer ends 21 and 22 spaced in the radial direction. Outer end 22 of control member 20 in the first position has a first spacing to second axis 54 in the radial direction larger than a second spacing from outer end 22 of control member 20 in the second position to second axis 54 in the radial direction. The first spacing is substantially not larger than a third spacing from the outer periphery of reinforcing section 13 to second axis 54 in the radial direction. Outer end 22 of control member 20 has a length T1 along the second axis smaller than length T2 of reinforcing section 13.

A spring 30 is received in receptacle 131 of reinforcing section 13 and has an end abutting inner end 21 of control member 20 for biasing outer end 22 of control member 20 to the first position.

In the preferred form shown, control member 20 further includes a groove 23 intermediate inner and outer ends 21 and 22 in the radial direction. Groove 23 includes first and second sliding faces 24 and 25 and first and second abutting faces 26 and 27. Specifically, first and second sliding faces 24 and 25 are parallel to each other and extend in a direction transverse to the radial direction. First and second abutting faces 26 and 27 are parallel to each other and extend in a direction transverse to first and second sliding faces 24 and 25. Second sliding face 25 is intermediate first and second abutting faces 26 and 27 in the radial direction and along second axis 54. First abutting face 26 is intermediate first and second sliding faces 24 and 25 in the radial direction and along second axis 54. Second abutting face 27 is intermediate second sliding face 25 and outer end 22 of control member 20 in the radial direction. First sliding face 24 is intermediate first abutting face 26 and inner end 21 of control member 20 in the radial direction. In the most preferred form shown, each of first and second abutting faces 26 and 27 is planar and extends in the radial direction. Second sliding face 25 is interconnected between first and second abutting faces 26 and 27. First abutting face 26 is interconnected between first and second sliding faces 24 and 25. Each of first and second sliding faces 24 and 25 is at a first acute angle with the radial direction and at a second acute angle with second axis 54.

In the preferred form shown, a mover 40 is movably received in bore 121 along second axis 54. Mover 40 includes first and second ends 41 and 42 spaced along second axis 54. First end 41 of mover 40 includes a stepped groove 411 on an outer periphery thereof. Second end 42 of mover 40 is moveably received in groove 23 of control member 20. Second end 42 of mover 40 includes a pressing face 422 and a third sliding face 421. Third sliding face 421 of mover 40 is intermediate pressing face 422 and first end 41 of mover 40 along second axis 54. Pressing face 422 is planar and perpendicular to second axis 54 and parallel to the first and second abutting faces 26 and 27. Third sliding face 421 is planar and at a third acute angle with the radial direction and at a fourth acute angle with second axis 54. The third acute angle is equal to the first acute angle, and the fourth acute angle is equal to the second acute angle. Second end 42 of mover 40 has a maximum cross sectional area smaller than the cross sectional area of first end 41 of mover 40.

In the preferred form shown, a detent member 50 in the most preferred form shown as a ball is movably received in detent hole 122 in the transverse direction. Detent member 50 is slideably coupled in stepped groove 411 of mover 40 and, thus, operably connected to mover 40 so that movement of mover 40 along second axis 54 allows movement of detent member 50 in the transverse direction between a protruded position at least partially outside of detent hole 122 and a retracted position in detent hole 122. Inner end 21 of control member 20 is operably engaged with mover 40, so that movement of control member 20 in the radial direction between the first and second positions allows movement of detent member 50 in the transverse direction between the protruded position and the retracted position through movement of mover 40 along second axis 54. When detent member 50 protrudes out of detent hole 122, drive column 12 can be coupled with an object, including but not limited to a socket, to be driven. Drive column 12 can be disengaged from the object when detent member 50 is received in detent hole 122.

Figure 1:
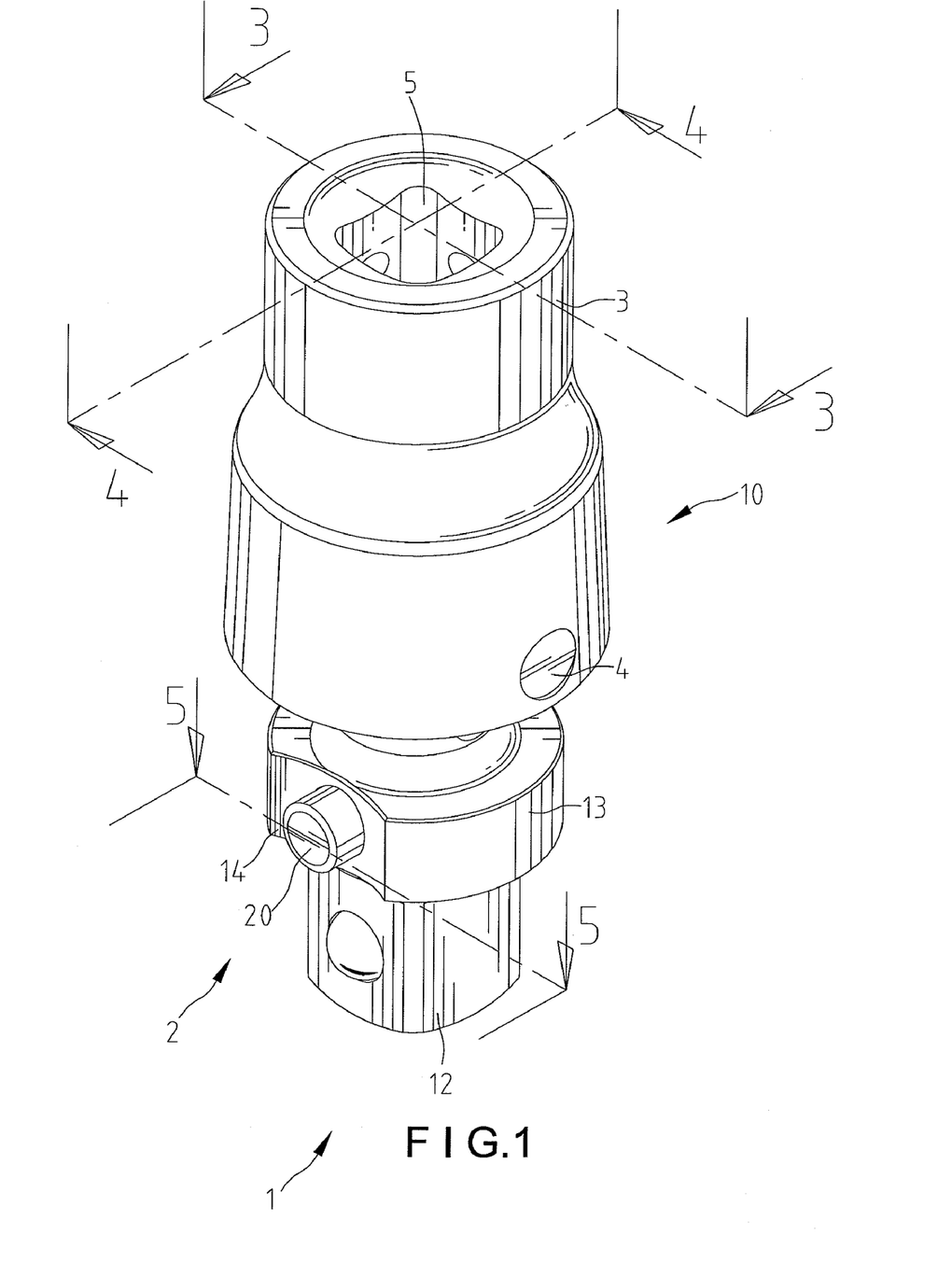
FIG. 1 shows a perspective view of a universal joint according to the preferred teachings of the present invention.
Figure 2:
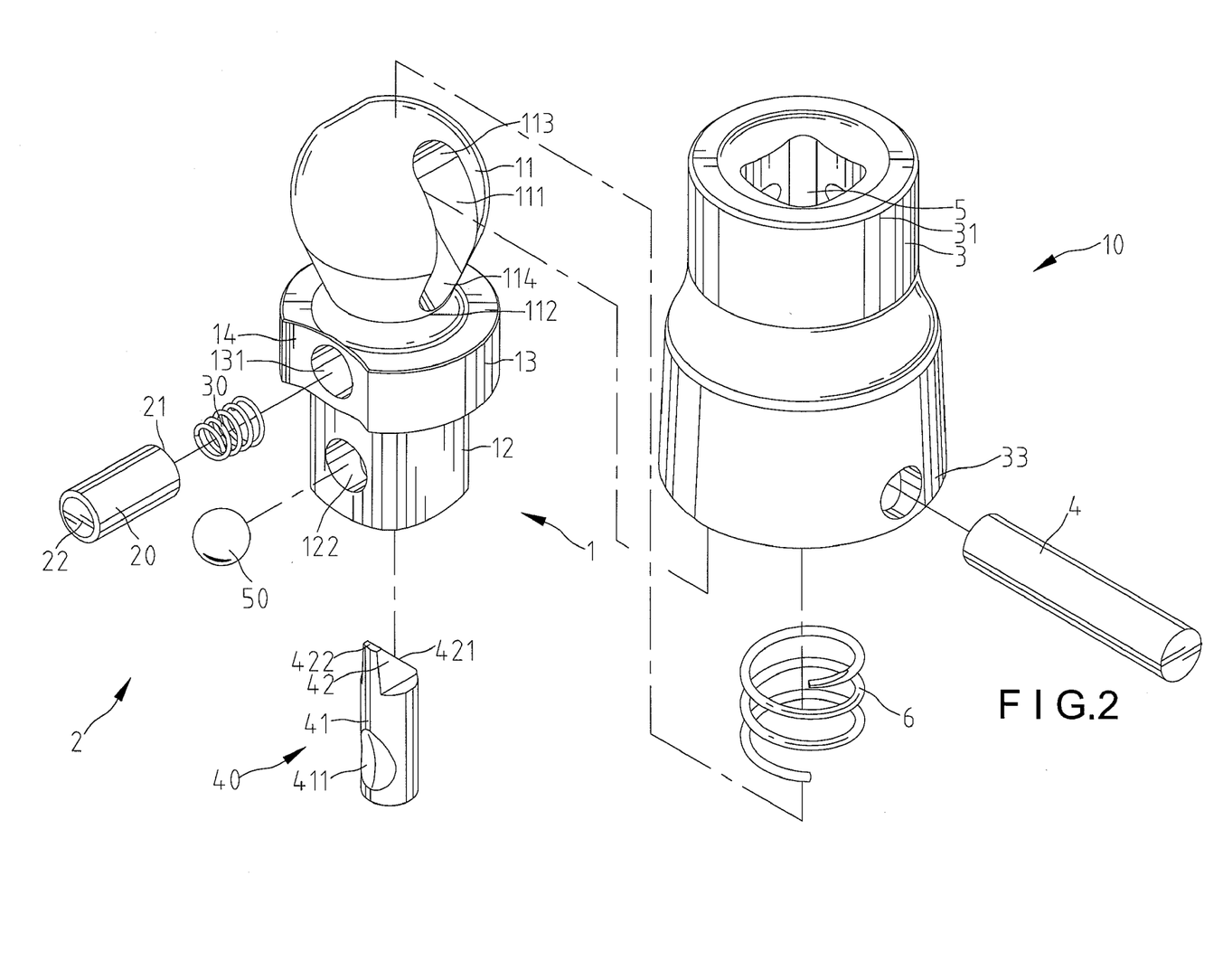
FIG. 2 shows an exploded, perspective view of the universal joint of FIG. 1.
Figure 3:
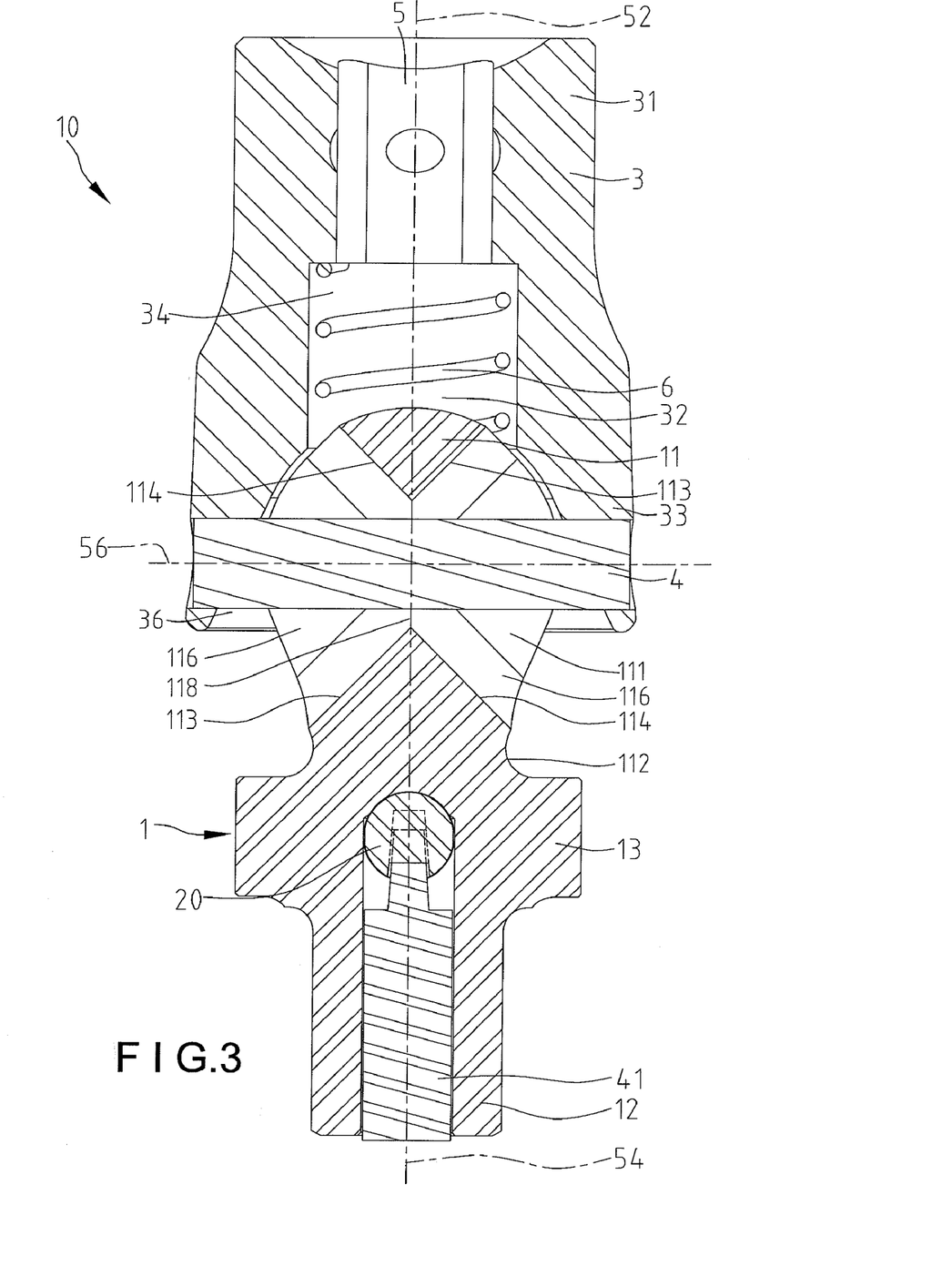
FIG. 3 shows a cross sectional view of the universal joint of FIG. 1 according to section line 3-3 of FIG. 1.
Figure 4:
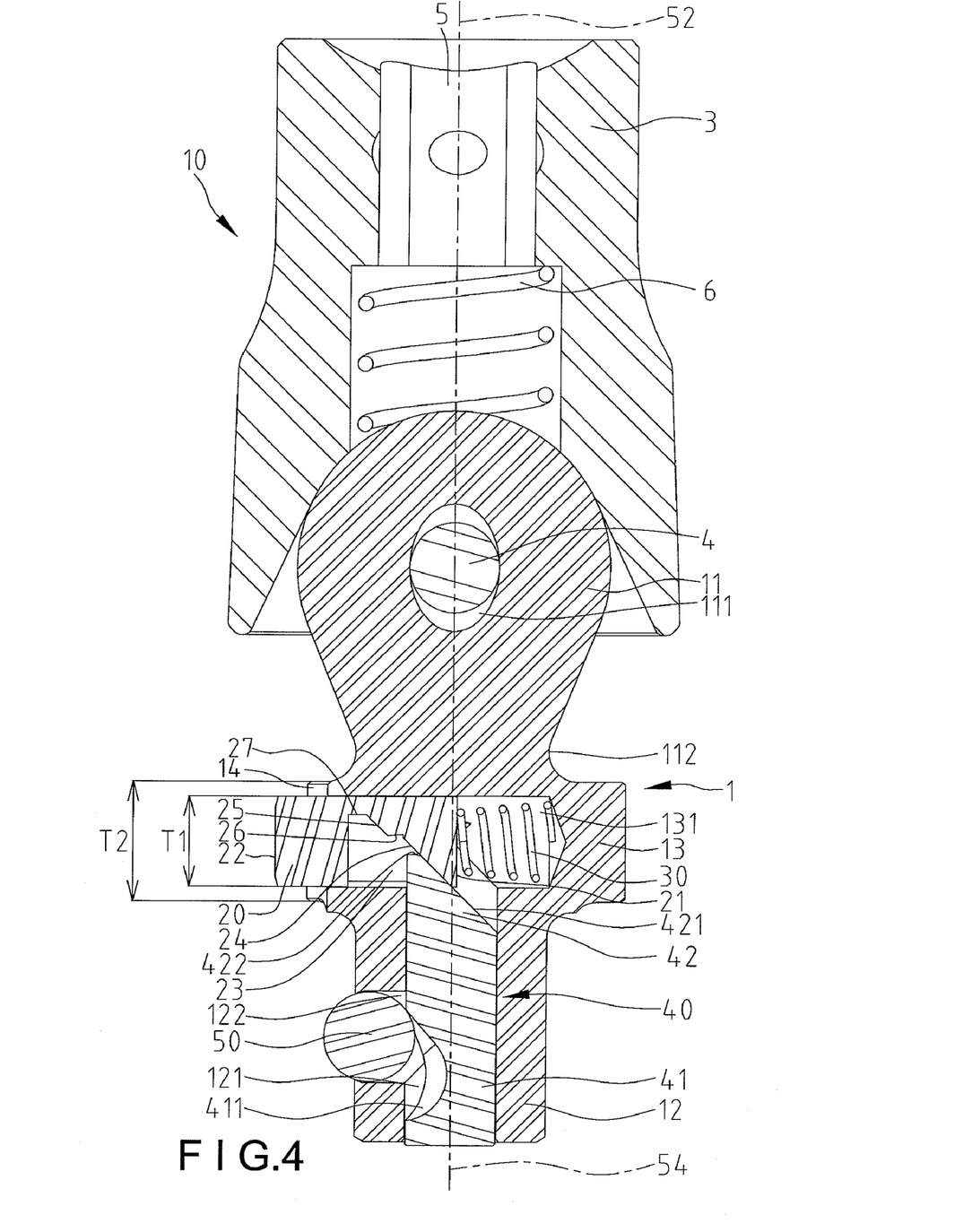
FIG. 4 shows a cross sectional view of the universal joint of FIG. 1 according to section line 4-4 of FIG. 1 with a control member in a first locking position.
Figure 5:
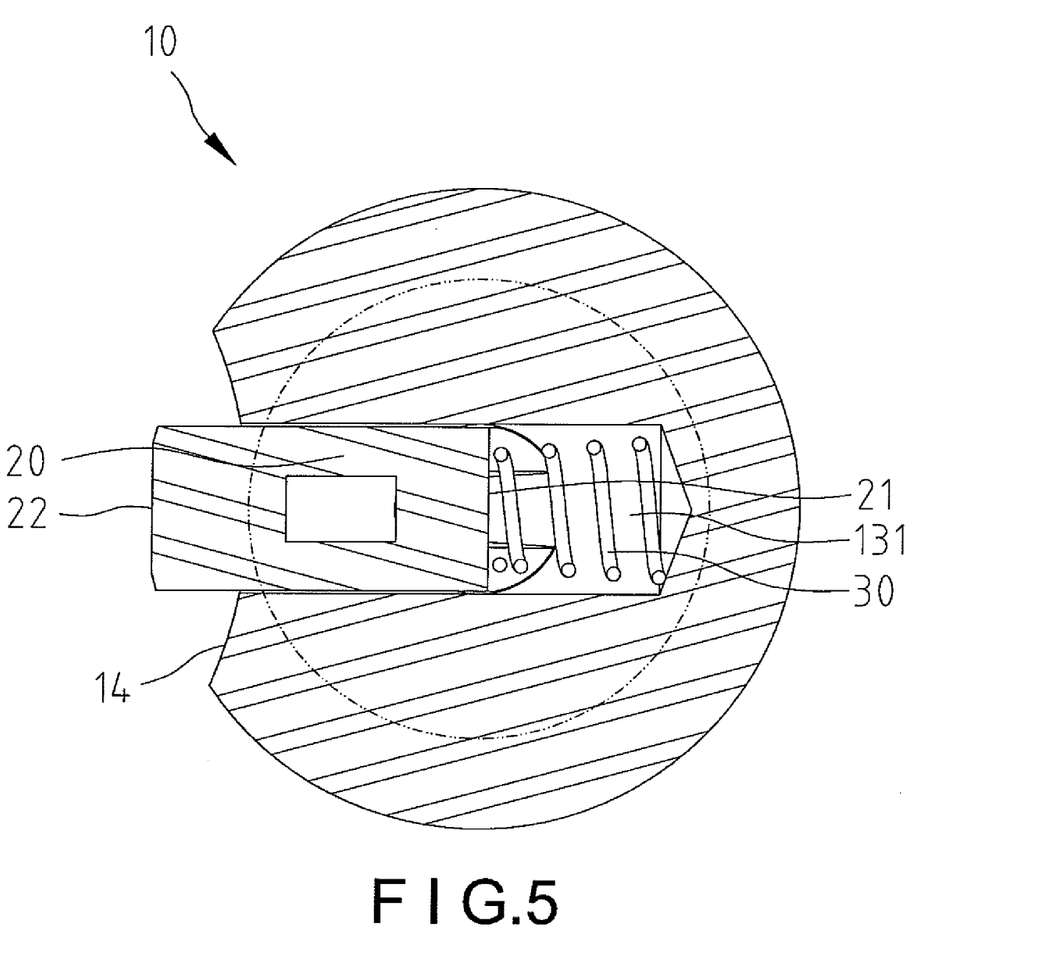
FIG. 5 shows a cross sectional view of the universal joint of FIG. 1 according to section line 5-5 of FIG. 1 with the control member in the first locking position.
Figure 6:
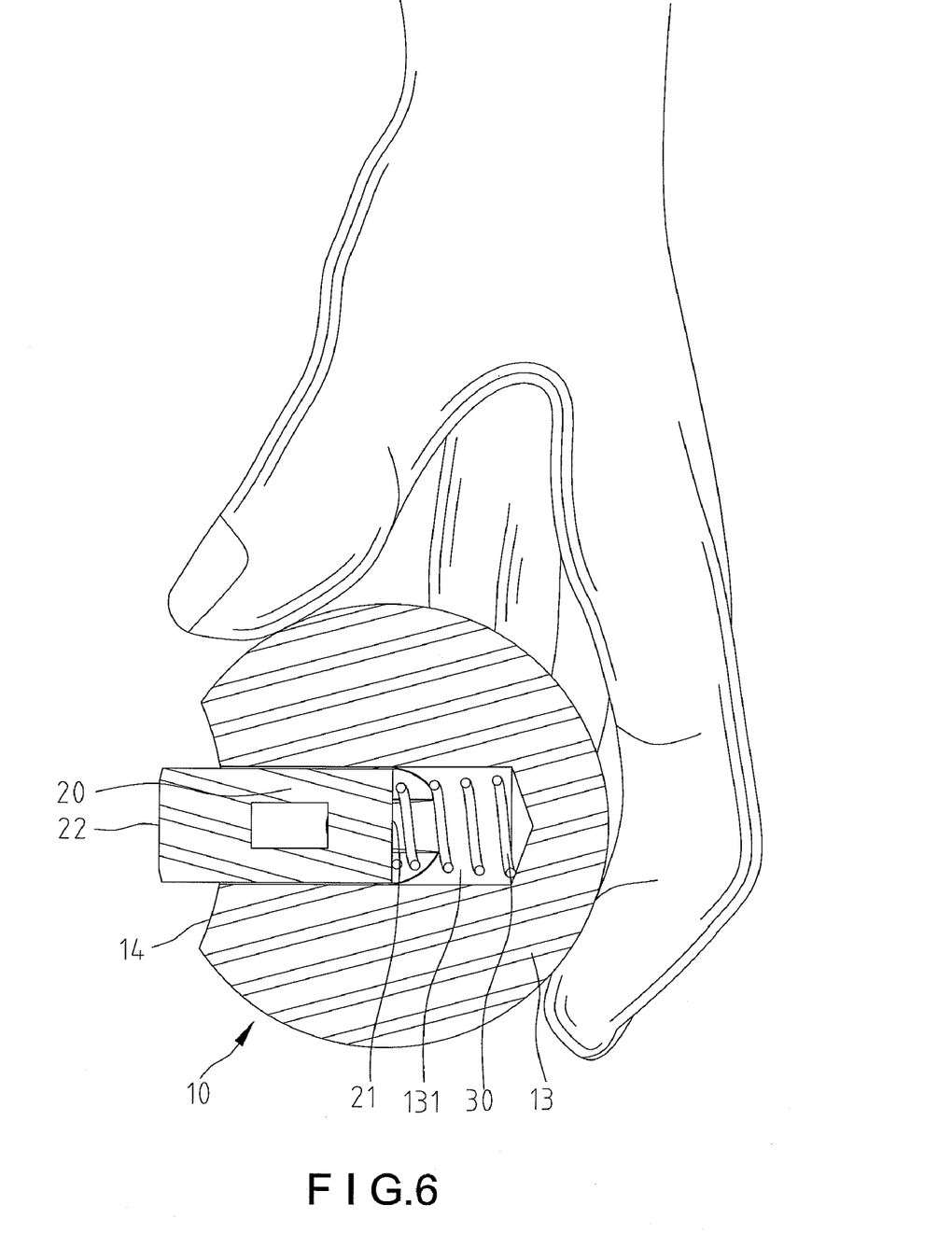
FIG. 6 shows a cross sectional view of the universal joint of FIG. 1 according to section line 5-5 of FIG. 1 with the universal joint held by an operator at a reinforced section and with the control member in the first locking position.

Now that the basic construction of universal joint 10 of the preferred teachings of the present invention has been explained, the operation and some of the advantages of universal joint 10 can be set forth and appreciated. In particular, for the sake of explanation, it will be assumed that control member 20 is in the first position (FIGS. 4-6). Third sliding face 421 abuts first sliding face 24, and pressing face 422 is spaced from first abutting face 26 along second axis 54 under the action of spring 30. Note that outer end 22 of control member 20 is substantially received in recessed portion 14 of reinforcing section 13. Furthermore, detent member 50 is moved by stepped groove 411 of mover 40 out of detent hole 121, allowing coupling of drive column 12 with the object to be driven. First end 31 of coupling member 3 is coupled to a tool for driving the object. An operator can hold universal joint 10 by reinforcing section 13 during operation of the tool. Thus, control member 20 in this state is in a first locking position, reliably preventing the object from disengaging from drive column 12.

In normal operation of universal joint 10, first axis 52 of coupling member 3 is coaxial with second axis 54 of body 1, so that first axis 52 of coupling member 3 is coaxial with the rotating axis of the object to be driven. However, coupling member 3 can be pivoted relative to body 1 about pivot axis 56 defined by pin 4 so that first axis 52 of coupling member 3 can be at an angle up to 45° with the rotating axis of the object, which is useful when the object is in a location difficult to access. This angle of 45° is larger than that achievable by conventional designs, allowing wider application of universal joint 10 according to the preferred teachings of the present invention.

Figure 7:
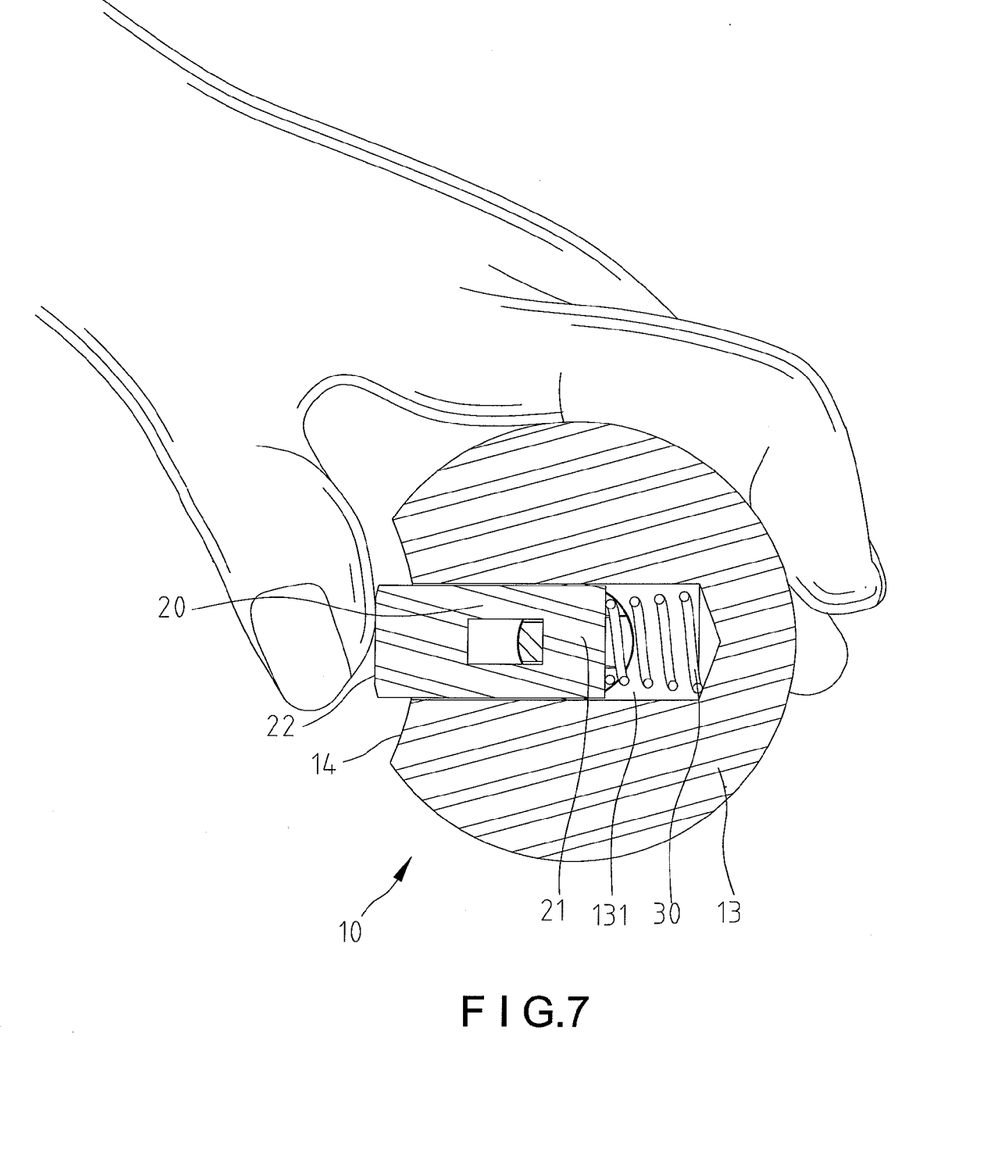
FIG. 7 shows a cross sectional view of the universal joint of FIG. 1 with the control member in a second locking position.
Figure 8:
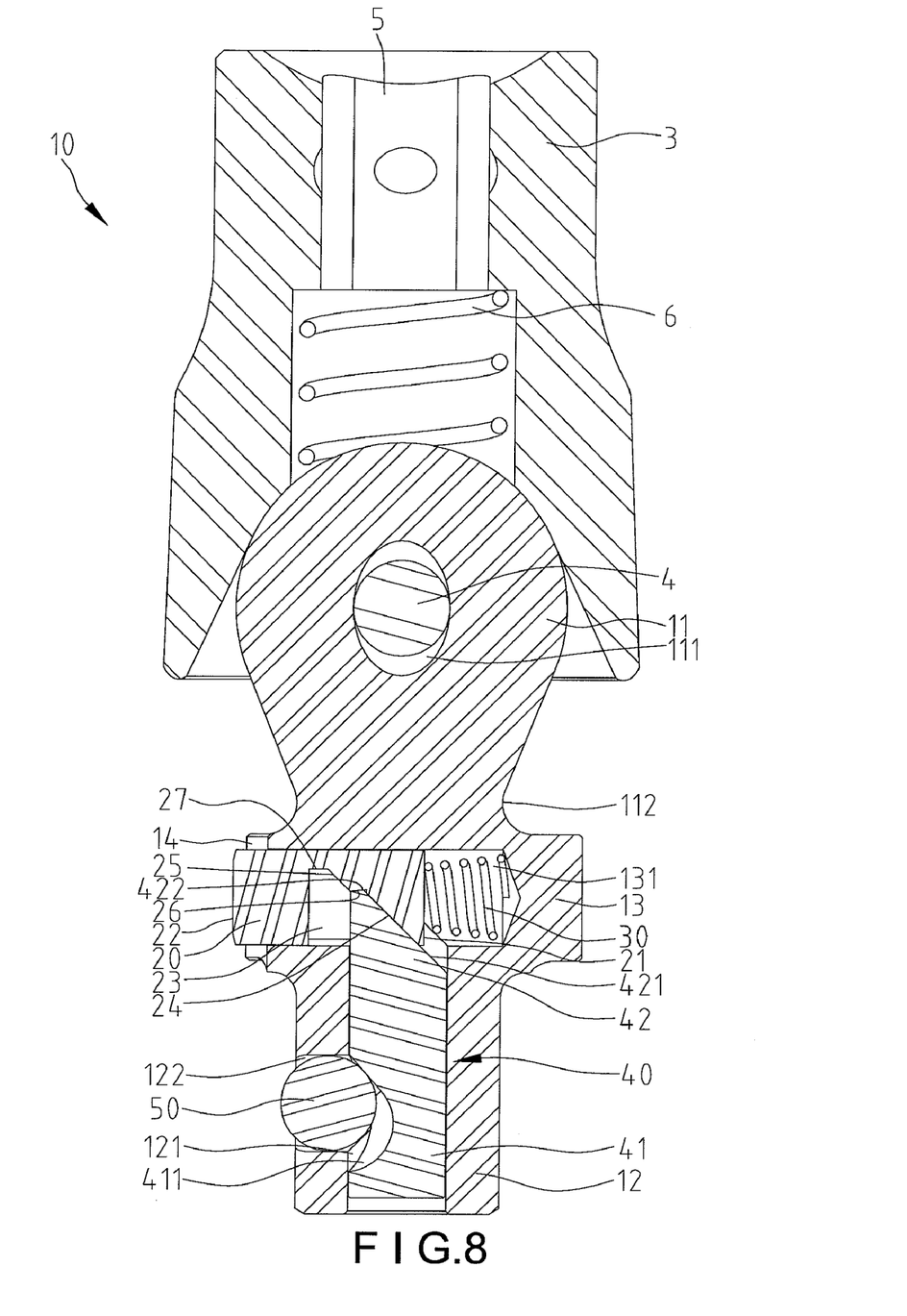
FIG. 8 shows a cross sectional view of the universal joint of FIG. 7 according to section line 4-4 of FIG. 1.

The operator can press control member 20 until third sliding face 421 abuts first sliding face 24 while pressing face 422 still abuts first abutting face 26 (FIGS. 7 and 8). Note that detent member 50 is partially received in stepped groove 411 but still protrudes out of detent hole 122, preventing the object from disengaging from drive column 12. Thus, control member 20 in this state is in a second locking position, reliably preventing the object from disengaging from drive column 12.

Control member 20 could be moved from the first locking position to the second locking position during operation. Specifically, universal joint 10 can be subjected to a pulling force during operation of the tool. The force can be imparted to control member 20 and/or mover 40 such that detent member 50 is urged towards mover 40, causing third sliding face 421 of mover 40 to slide relative to first sliding face 24 of control member 20 until pressing face 422 abuts first abutting face 26. Further sliding movement of mover 40 relative to control member 20 into groove 23 is prevented by first abutting face 26. Thus, detent member 50 will remain partially received in stepped groove 411 but still protrudes out of detent hole 122, preventing the object from disengaging from drive column 12.

Figure 9:
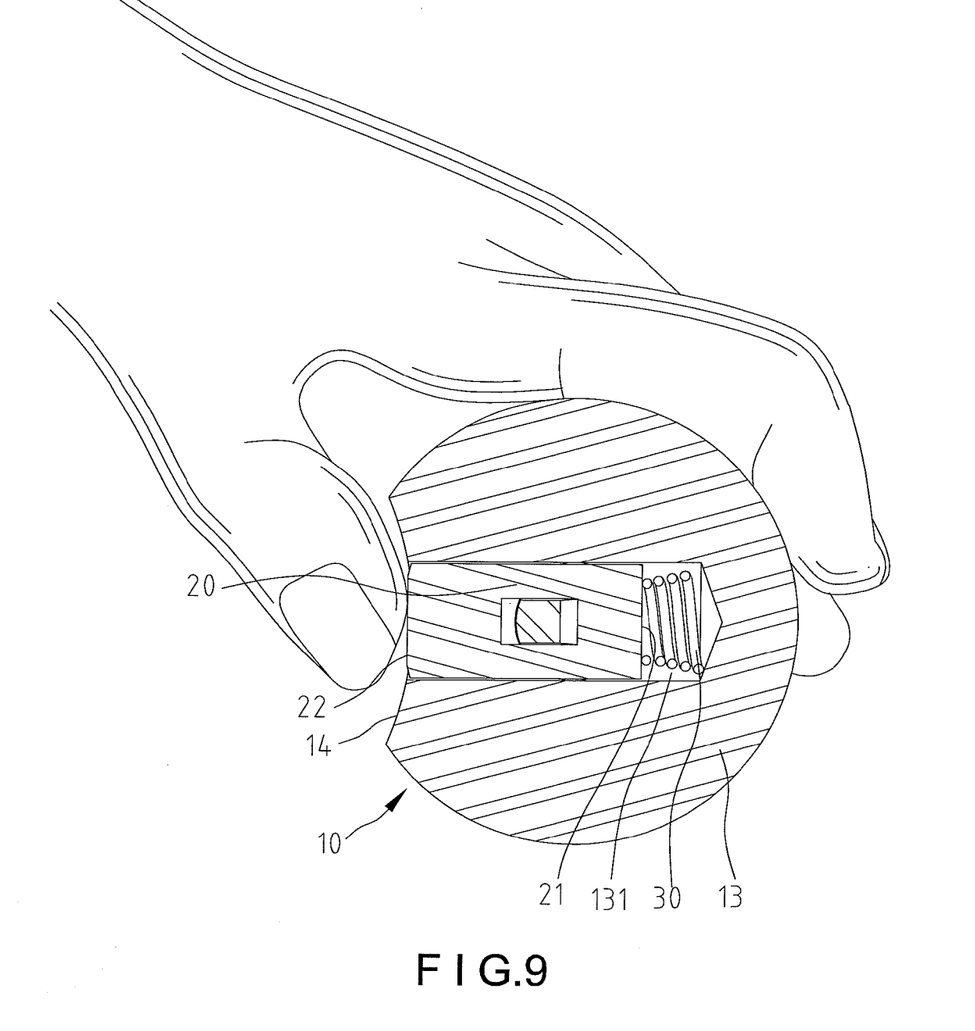
FIG. 9 shows a cross sectional view of the universal joint of FIG. 1 according to section line 4-4 of FIG. 1 with the control device in a releasing position.
Figure 10:
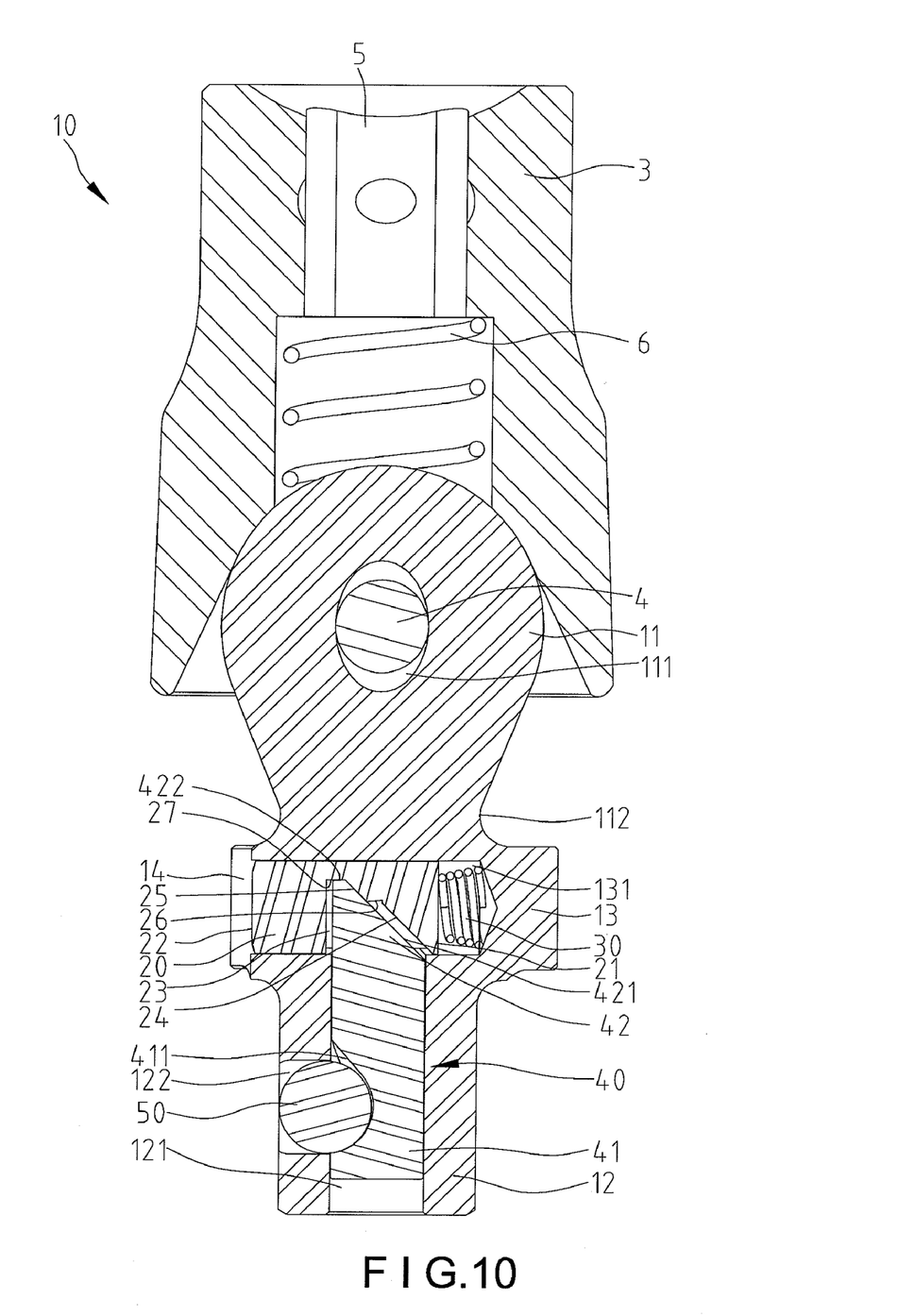
FIG. 10 shows a cross sectional view of the universal joint of FIG. 9 according to section line 4-4 of FIG. 1.

The operator can press control member 20 to the second position, that is a releasing position, allowing the object to be disengaged from drive column 12. Spring 30 is compressed by inner end 21 of controller member 20. Pressing face 422 of mover 40 is disengaged from first abutting face 26 of control member 20, and third sliding face 421 of mover 40 comes in contact with and is slideable on second sliding face 25 of control member 20 until pressing face 422 of mover 40 comes in contact with and is stopped by second abutting face 27 of control member 20. Thus, detent member 50 can be completely moved into stepped groove 411 of mover 40, while mover 40 slides inward into groove 23 of control member 20 along the second axis. Note that the thumb of the hand of the operator pressing control member 20 is received in recessed portion 14 of reinforcing section 13, while the other fingers of the hand are gripping the outer periphery of reinforcing section 13. Although outer end 22 of control member 20 in the most preferred form shown is completely received in receptacle 131 of reinforcing section 13 when control member 20 is in the second position, outer end 22 of control member 20 can be in recessed portion 14 when control member 20 is in the second position.

Since outer end 22 of control member 20 never protrudes outward away from reinforcing section 13 beyond recessed portion 14, injury to the hand of the operator and damage to control member 20 during rotation of universal joint 10 are avoided. Recessed portion 14 provides a room allowing easy operation by the operator. Since length T1 of control member 20 is smaller than length T2 of reinforcing section 13, reinforcing section 13 possesses a structural strength sufficient to withstand torque imparted to drive column 12 and rounded base 11.

Now that the basic teachings of the present invention have been explained, many extensions and variations will be obvious to one having ordinary skill in the art. For example, pressing face 422 of mover 40 does not have to abut second abutting face 27 of control member 20 when control member 20 is in the second position. Furthermore, the pivotal connection between second end 33 of coupling member 3 and rounded base 11 of body 1 can be achieved in other arrangements.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A universal joint comprising, in combination:
a coupling member including first and second ends spaced along a first axis, with the first end of the coupling member adapted to be coupled to a tool;
a body including a rounded base and a drive column spaced along a second axis, with the rounded base being pivotably mounted to the second end of the coupling member about a pivot axis perpendicular to the first axis, allowing adjustment in an angle between the first and second axes, with the body further including a reinforcing section intermediate the rounded base and the drive column along the second axis and a neck intermediate the rounded base and the reinforcing section, with the reinforcing section including an outer periphery about the second axis of a radial extent greater than the drive column and the neck, with the outer periphery of the reinforcing section including a recessed portion having a receptacle extending in a radial direction perpendicular to the second axis, with the drive column including a bore extending along the second axis and in communication with the receptacle, with the drive column further including a detent hole extending in a transverse direction transverse to and in communication with the bore, with a mover movably received in the bore along the second axis, with a detent member movably received in the detent hole in the transverse direction, with the detent member operably connected to the mover so that movement of the mover along the second axis allows movement of the detent member in the transverse direction between a protruded position at least partially outside of the detent hole and a retracted position in the detent hole, with the drive column being adapted to couple with an object to be driven when the detent member protrudes out of the detent hole, with the drive column disengageable from the object when the detent member is received in the detent hole; and
a control member moveably received in the receptacle between first and second positions spaced in the radial direction, with the control member including inner and outer ends spaced in the radial direction, with the outer end of the control member in the first position having a first spacing to the second axis in the radial direction larger than a second spacing from the outer end of the control member in the second position to the second axis in the radial direction, with the first spacing being substantially not larger than a third spacing from the outer periphery of the reinforcing section to the second axis in the radial direction, with the inner end of the control member operably engaged with the mover, so that movement of the control member in the radial direction between the first and second positions allows movement of the detent member in the transverse direction between the protruded position and the retracted position through movement of the mover along the second axis.

2. The universal joint as claimed in claim 1, with the control member further including a groove intermediate the inner and outer ends in the radial direction, with the groove including first and second sliding faces and first and second abutting faces, with the first and second sliding faces parallel to each other and extending in a direction transverse to the radial direction, with the first and second abutting faces parallel to each other and extending in a direction transverse to the first and second sliding faces, with the second sliding face intermediate the first and second abutting faces in the radial direction and along the second axis, with the second abutting surface intermediate the first and second sliding faces in the radial direction and along the second axis, with the second abutting face intermediate the second sliding face and the outer end of the control member in the radial direction, with the first sliding face intermediate the first abutting face and the inner end of the control member in the radial direction, with the mover including first and second ends spaced along the second axis, with the second end of the mover moveably received in the groove of the control member, with the second end of the mover including a pressing face and a third sliding face, with the universal joint further comprising, in combination: a first spring received in the receptacle of the reinforcing section and biasing the control member to the first position,
wherein when the control member is in the first position, the third sliding face abuts the first sliding face, and the pressing face is spaced from the first abutting face along the second axis, and
wherein when the control member is in the second position, the third sliding face abuts the second sliding face.

3. The universal joint as claimed in claim 2, with the detent member protruding out of the detent hole when the third sliding face abuts the first sliding face and when the pressing face abuts the first abutting face, preventing the object from disengaging from the drive column.

4. The universal joint as claimed in claim 3, with each of the first and second abutting faces being planar and extending in the radial direction, and with the pressing face abutting the second abutting face when the control member is in the first position.

5. The universal joint as claimed in claim 3, with the first sliding face interconnected between the first and second abutting faces, with the first abutting surface interconnected between the first and second sliding faces, and with each of the first and second sliding faces at a first acute angle with the radial direction and at a second acute angle with the second axis.

6. The universal joint as claimed in claim 5, with the third sliding face of the mover intermediate the pressing face and the first end of the mover along the second axis, and with the pressing face being planar and perpendicular to the second axis and parallel to the first and second abutting faces.

7. The universal joint as claimed in claim 6, with the third sliding face being planar and at a third acute angle with the radial direction and at a fourth acute angle with the second axis, with the third acute angle equal to the first acute angle, and with the fourth acute angle equal to the second acute angle.

8. The universal joint as claimed in claim 7, with the rounded base including a through-hole, with the second end of the coupling member including a compartment having an outer section and an inner section intermediate the outer section and the first end of the coupling member along the first axis, with the rounded base pivotably received in the outer section, with the universal joint further comprising, in combination: a pin defining the pivot axis and extending through the second end of the coupling member along the pivot axis and through the through-hole, pivotably connecting the rounded base to the second end of the coupling member; and a second spring received in the inner section and biasing the rounded base away from the inner section.

9. The universal joint as claimed in claim 8, with the through-hole including first and second sectors on opposite sides of the second axis, with the first sector including first and second sidewalls spaced along the second axis, with the second sidewall of the first sector intermediate the first sidewall of the first sector and the reinforcing section along the second axis, with the second sector including third and fourth sidewalls spaced along the second axis, with the third sidewall of the second sector intermediate the fourth sidewall of the second sector and the reinforcing section along the second axis, with the first sidewall of the first sector perpendicular to the fourth sidewall of the second sector, with the second sidewall of the first sector perpendicular to the third sidewall of the second sector, with the first sidewall of the first sector parallel to and spaced from the third sidewall of the second sector and at a fifth acute angle with the second axis, and with the second sidewall of the first sector parallel to and spaced from the fourth sidewall of the second sector and at a sixth acute angle with the second axis the same as the fifth acute angle.

10. The universal joint as claimed in claim 5, with the outer end of the control member having a first length along the second axis, with the reinforcing section having a second length along the second axis, and with the second length larger than the first length.

11. The universal joint as claimed in claim 1, with the rounded base including a through-hole, with the second end of the coupling member including a compartment having an outer section and an inner section intermediate the outer section and the first end of the coupling member along the first axis, with the rounded base pivotably received in the outer section, with the universal joint further comprising, in combination: a pin defining the pivot axis and extending through the second end of the coupling member along the pivot axis and through the through-hole, pivotably connecting the rounded base to the second end of the coupling member; and a second spring received in the inner section and biasing the rounded base away from the inner section.

12. A universal joint comprising, in combination:
a coupling member including first and second ends spaced along a first axis, with the first end of the coupling member adapted to be coupled to a tool, with the second end of the coupling member including a compartment having an outer section and an inner section intermediate the outer section and the first end of the coupling member along the first axis;
a body including a rounded base and a drive column spaced along a second axis, with the rounded base pivotably received in the outer section of the second end of the coupling member about a pivot axis perpendicular to the first axis, allowing adjustment in an angle between the first and second axes, with the rounded base including a through-hole, with the through-hole including first and second sectors on opposite sides of the second axis, with the body further including a reinforcing section intermediate the rounded base and the drive column along the second axis, with the first sector including first and second sidewalls spaced along the second axis, with the second sidewall of the first sector intermediate the first sidewall of the first sector and the reinforcing section along the second axis, with the second sector including third and fourth sidewalls spaced along the second axis, with the third sidewall of the second sector intermediate the fourth sidewall of the second sector and the reinforcing section along the second axis, with the first sidewall of the first sector perpendicular to the fourth sidewall of the second sector, with the second sidewall of the first sector perpendicular to the third sidewall of the second sector, with the first sidewall of the first sector parallel to and spaced from the third sidewall of the second sector and at a first acute angle with the second axis, and with the second sidewall of the first sector parallel to and spaced from the fourth sidewall of the second sector and at a second acute angle with the second axis being the same as the first acute angle, with the reinforcing section including an outer periphery about the second axis, with the outer periphery of the reinforcing section including a recessed portion having a receptacle extending in a radial direction perpendicular to the second axis, with the drive column including a bore extending along the second axis and in communication with the receptacle, with the drive column further including a detent hole extending in a transverse direction transverse to and in communication with the bore, with a mover movably received in the bore along the second axis, with a detent member movably received in the detent hole in the transverse direction, with the detent member operably connected to the mover so that movement of the mover along the second axis allows movement of the detent member in the transverse direction between a protruded position at least partially outside of the detent hole and a retracted position in the detent hole, with the drive column being adapted to couple with an object to be driven when the detent member protrudes out of the detent hole, with the drive column disengageable from the object when the detent member is received in the detent hole;
a control member moveably received in the receptacle between first and second positions spaced in the radial direction, with the control member including inner and outer ends spaced in the radial direction, with the outer end of the control member in the first position having a first spacing to the second axis in the radial direction larger than a second spacing from the outer end of the control member in the second position to the second axis in the radial direction, with the first spacing being substantially not larger than a third spacing from the outer periphery of the reinforcing section to the second axis in the radial direction, with the inner end of the control member operably engaged with the mover, so that movement of the control member in the radial direction between the first and second positions allows movement of the detent member in the transverse direction between the protruded position and the retracted position through movement of the mover along the second axis; and a pin defining the pivot axis and extending through the second end of the coupling member along the pivot axis and through the through-hole, pivotably connecting the rounded base to the second end of the coupling member; and a second spring received in the inner section and biasing the rounded base away from the inner section.

13. The universal joint as claimed in claim 12, with the control member further including a groove intermediate the inner and outer ends in the radial direction, with the groove including first and second sliding faces and first and second abutting faces, with the first and second sliding faces parallel to each other and extending in a direction transverse to the radial direction, with the first and second abutting faces parallel to each other and extending in a direction transverse to the first and second sliding faces, with the second sliding face intermediate the first and second abutting faces in the radial direction and along the second axis, with the second abutting surface intermediate the first and second sliding faces in the radial direction and along the second axis, with the second abutting face intermediate the second sliding face and the outer end of the control member in the radial direction, with the first sliding face intermediate the first abutting face and the inner end of the control member in the radial direction, with the mover including first and second ends spaced along the second axis, with the second end of the mover moveably received in the groove of the control member, with the second end of the mover including a pressing face and a third sliding face, with the universal joint further comprising, in combination: a first spring received in the receptacle of the reinforcing section and biasing the control member to the first position, wherein when the control member is in the first position, the third sliding face abuts the first sliding face, and the pressing face is spaced from the first abutting face along the second axis, and wherein when the control member is in the second position, the third sliding face abuts the second sliding face.

14. The universal joint as claimed in claim 13, with the detent member protruding out of the detent hole when the third sliding face abuts the first sliding face and when the pressing face abuts the first abutting face, preventing the object from disengaging from the drive column.

15. The universal joint as claimed in claim 14, with each of the first and second abutting faces being planar and extending in the radial direction, and with the pressing face abutting the second abutting face when the control member is in the first position.

16. The universal joint as claimed in claim 15, with the first sliding face interconnected between the first and second abutting faces, with the first abutting surface interconnected between the first and second sliding faces, and with each of the first and second sliding faces at a first acute angle with the radial direction and at a second acute angle with the second axis.

17. The universal joint as claimed in claim 16, with the third sliding face of the mover intermediate the pressing face and the first end of the mover along the second axis, and with the pressing face being planar and perpendicular to the second axis and parallel to the first and second abutting faces.

18. The universal joint as claimed in claim 17, with the third sliding face being planar and at a third acute angle with the radial direction and at a fourth acute angle with the second axis, with the third acute angle equal to the first acute angle, and with the fourth acute angle equal to the second acute angle.

19. The universal joint as claimed in claim 16, with the outer end of the control member having a first length along the second axis, with the reinforcing section having a second length along the second axis, and with the second length larger than the first length.

* * * * *